US005515138A

United States Patent [19]
Hasegawa et al.

[11] Patent Number: 5,515,138
[45] Date of Patent: May 7, 1996

[54] METHOD OF POSITIONING MASK USING VARIABLE MASK MECHANISM AND VARIABLE MASK MECHANISM

[75] Inventors: Takeshi Hasegawa; Takashi Yamamoto, both of Kanagawa, Japan

[73] Assignee: Fuji Photo Film Co., Ltd., Kanagawa, Japan

[21] Appl. No.: 447,697

[22] Filed: May 23, 1995

[30] Foreign Application Priority Data

Sep. 6, 1994 [JP] Japan .................................... 6-212644

[51] Int. Cl.⁶ .......................... G03B 27/42; G03B 27/52; G03B 27/74
[52] U.S. Cl. ................................. 355/67; 355/53; 355/77; 355/68; 355/46
[58] Field of Search .................................. 355/53, 77, 46, 355/18, 66, 74, 68, 67, 60

[56] References Cited

U.S. PATENT DOCUMENTS

| | | | |
|---|---|---|---|
| 4,093,378 | 6/1978 | Horr et al. | 355/76 |
| 4,298,273 | 11/1981 | Nishizuka et al. | 355/61 |
| 4,668,082 | 5/1987 | Terashita et al. | 355/77 |
| 4,786,944 | 11/1988 | Sakamoto et al. | 355/20 |
| 4,816,874 | 3/1989 | Terashita et al. | 355/38 |
| 4,821,073 | 4/1989 | Backus et al. | 355/68 |
| 4,937,618 | 6/1990 | Ayata et al. | 355/43 |
| 5,006,886 | 4/1991 | Susuki | 355/46 |
| 5,359,389 | 10/1994 | Isohata | 355/53 |

Primary Examiner—A. T. Grimley
Assistant Examiner—Herbert Kerner
Attorney, Agent, or Firm—Sughrue, Mion, Zinn, Macpeak & Seas

[57] ABSTRACT

A method of positioning a mask using a variable mask mechanism capable of displacing the mask for partially blocking a light beam for exposing a photosensitive material and of changing the amount of opening of an aperture through which the light beam passes, is provided which comprises the steps of measuring the density of each of images on a negative film in a state in which the mask is in alignment with a range in which the density of each image can be measured and thereafter shifting the mask to a range in which the images on the negative film can be exposed, thereby exposing the photosensitive material. Therefore, a position permissible range of the mask at the time of photometry and exposure is expanded. It is thus unnecessary to position the mask with accuracy higher than required. Further, the manufacturing cost of the variable mask mechanism can be reduced.

20 Claims, 12 Drawing Sheets

METHOD OF POSITIONING MASK USING VARIABLE MASK MECHANISM AND VARIABLE MASK MECHANISM

BACKGROUND OF THE INVENTION

1. Field of the Invention

The present invention relates to a method of positioning a mask using a variable mask mechanism capable of controlling the amount of opening of an aperture for allowing an exposure light beam to pass therethrough when images on a negative film are exposed onto a photosensitive material and to a variable mask mechanism using the method, which is employed in, for example, a photographic printer or a printer-processor which is a combination of a photographic printer and a processor.

2. Description of the Related Art

A printer-processor is a so-called "mini-laboratory" and is used in a developing, printing and enlargement (DPE) shop or the like. In the printer-processor, a printer unit, which prints/exposes images recorded on a negative film onto photographic paper, and a processor unit, which effects development processing of the printed and exposed photographic paper, are combined into a single unit. By simply setting an elongated photographic paper at the printer-processor, the photographic paper can be automatically conveyed to the printer unit and the processor unit and processed thereat.

In the printer unit of the printer-processor, the images recorded on the negative film are enlarged to selected predetermined sizes and are printed onto photographic paper. The photographic paper on which the images of the negative film have been printed is successively conveyed to the processor unit where the negative film is subjected to developing processing so that the images are finished as photographic prints.

Panorama-size photographic prints whose transverse lengths are twice those of full size photographic prints, which is the normal size, have been widespread in addition to full-size photographic prints. Now, there is a tendency for image-frame sizes to increase.

Further, a frame-size switching camera is commercially available which can freely switch an aspect ratio between full-size frames corresponding to image frames of full-size and panorama-size frames corresponding to image frames of panorama size in the course of photographically recording a single negative film. When the frame-size switching camera is used, the single negative film is mixed with full-size image frames and screen-size image frames different in aspect ratio from full-size image frames such as panorama-size image frames, etc.

As a result, a drawback has become prominent particularly in recent years in that many types of negative masks for fixing negative films onto a negative carrier for positioning the negative films are required according to image frame sizes and a cumbersome process of replacing a negative mask with another is often needed. It has therefore been desirable to adopt a variable mask mechanism capable of changing the size of a negative mask without replacing the negative mask with another.

Even if this type of variable mask mechanism is adopted, it is necessary to measure the density of the negative film in advance when images on the negative film are printed onto photographic paper. Therefore, a light beam sent from the negative film side is transmitted to a density measuring unit located at a position different from the position of the photographic paper to measure the density of the negative film.

Thus, optical paths are different in length from each other when the density of each image is measured by the density measuring unit and the images are exposed onto photographic paper. In line with this, the degree of opening of the mask, which is originally required, is varied.

In the prior art, however, the mask is located in the same position so as to be able to meet conditions at the time of without varying the degree of opening of the mask between photometry and exposure. It is therefore necessary to more accurately position the mask than is required. As a result, the manufacturing costs of the variable mask mechanism is increased.

SUMMARY OF THE INVENTION

With the foregoing in view, it is therefore an object of the present invention to provide a method of positioning a mask using a variable mask mechanism capable of reducing its manufacturing cost and easily changing the amount of opening according to a change in the size of an image frame on a negative film and to a variable mask mechanism.

According to one aspect of the present invention, for achieving the above object, there is provided a method of positioning a mask using a variable mask mechanism capable of displacing the mask for partially blocking a light beam for exposing a photosensitive material when images on a negative film are exposed onto the photosensitive material and of changing the amount of opening of an aperture through which the light beam passes, which comprises the step of measuring the density of each image by a density measuring unit in a state in which the mask is in alignment with a range in which the density of the image on the negative film is measurable; and thereafter shifting the mask to a range in which the images on the negative film can be exposed; to change the amount of opening of the aperture, thereby exposing the photosensitive material provided on an optical path different from an optical path extending to the density measuring unit.

The above mask positioning method can bring about the following effects.

The density of each image is measured by the density measuring unit in a state in which the mask for partially blocking the light beam is in alignment with the range in which the density of each image on the negative film is measurable. Thereafter, the mask is shifted so as to be aligned with the range in which the images on the negative film can be exposed onto the photosensitive material. Therefore, the amount of opening of the aperture is substantially changed to expose the images on the negative film onto the photosensitive material provided on the optical path different from the optical path extending to the density measuring unit.

Thus, since the position of the mask is changed upon photometry and exposure, the mask may stop moving within permissible position ranges at the time of photometry and exposure. Therefore, the permissible position ranges of the mask at the time of photometry and exposure expand as compared with the case where the degree of opening of the mask remains unchanged between on-photometry and on-exposure, whereby the mask does not need to be positioned with high precision and the accuracy of stopping the mask can be sufficiently ensured. It is thus unnecessary to position the mask with accuracy higher than required. Further, the manufacturing cost of the variable mask mechanism can be reduced.

In a specific example of the present invention, it is preferable that when the density of each image is measured, the optical path is bent to send the light beam to the density measuring unit side and the density of each image is measured by a density measuring unit having a color filter and a photosensor. According to the mask positioning method using the variable mask mechanism, the density of each of the images on the negative film can be easily measured even by a density measuring unit located in a position different from the position of the photosensitive material.

According to another aspect of the present invention, there is provided a method of positioning a mask using a variable mask mechanism capable of displacing the mask for partially blocking a light beam for exposing a photosensitive material when images on a negative film are exposed onto the photosensitive material and of changing an amount of opening of an aperture through which the light beam passes, the method comprising the step of measuring the density of each image by a density measuring unit in a state in which the mask is in alignment with a range in which the density of the image on the negative film is measurable; temporarily shifting the mask to a position set as an origin; and thereafter displacing the mask to a range in which the images on the negative film can be exposed, to change the amount of opening of the aperture, thereby exposing the photosensitive material provided on an optical path different from an optical path extending to the density measuring unit.

The above mask positioning method can bring about the following effects.

The present aspect is operated in a manner similar to the one aspect of the present invention. In the present aspect, however, the operation of shifting the mask to the position set as the origin is inserted between the density measuring step and the printing/exposing step.

Thus, the present aspect is not operated in the same manner as the one aspect of the present invention. Further, even if a backlash or the like occurs in the variable mask mechanism, the accuracy of positioning the mask at the time of the density measurement and the printing/exposure can be more easily ensured.

In a specific example of the present invention, it is preferable to detect, using a mask-detectable transmissive photosensor, that the mask exists in the position set as the origin when the mask is shifted to the position. The accuracy of positioning the mask can be easier ensured by the mask positioning method.

According to a further aspect of the present invention, there is provided a variable mask mechanism capable of displacing a mask for partially blocking a light beam for exposing a photosensitive material when images on a negative film are exposed onto the photosensitive material and of changing the amount of opening of an aperture through which the light beam passes, comprising a drive source for displacing the mask to change the amount of opening of the aperture; a sensor for detecting the mask to confirm the position of the mask; and a controller for controlling an operation of the drive source based on information sent from the sensor upon measuring the density of each image so as to align the mask with a range in which the density of each image on the negative film is measurable and for controlling the operation of the drive source based on the information to shift the mask to a range in which the images on the negative film can be exposed, upon exposing the photosensitive material, to thereby change the amount of opening of the aperture.

The above variable mask mechanism can bring about the following effects.

The controller controls the operation of the drive source for changing the amount of opening of the aperture, based on the signal generated from the sensor capable of sensing the position of the mask.

Therefore, when the density of each image is measured, the controller controls the operation of the drive source based on the information outputted from the sensor to align the mask with the range in which the density of each of the images on the negative film can be measured. Further, when the photosensitive material is exposed, the controller controls the operation of the drive source based on the information produced from the sensor so as to shift the mask to the range in which the images on the negative film can be exposed, thereby making it possible to change the amount of opening of the aperture.

Thus, since the position of the mask changes upon photometry and exposure, the present aspect is operated in a manner similar to the one aspect of the present invention and the allowable range of the mask position increases. It is thus unnecessary to position the mask with accuracy higher than required. Further, the variable mask mechanism can be reduced in manufacturing cost.

In a specific example of the present invention, it is preferable that the drive source comprises a motor and a gear for reducing a rotational speed of the motor and transferring the reduced rotational speed and a transmissive photosensor is used as the sensor. With such a variable mask mechanism, the variable mask mechanism can be reduced in manufacturing cost and the accuracy of positioning the mask can be easier ensured.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENT

A printer processor, in which the variable mask mechanism of one embodiment of the present invention is utilized and in which the method of positioning a mask using a variable mask mechanism of another embodiment of the present invention is executed, is illustrated in FIGS. 1 through 12. The present embodiments will be described below with reference to FIGS. 1 through 12.

Figure 1:
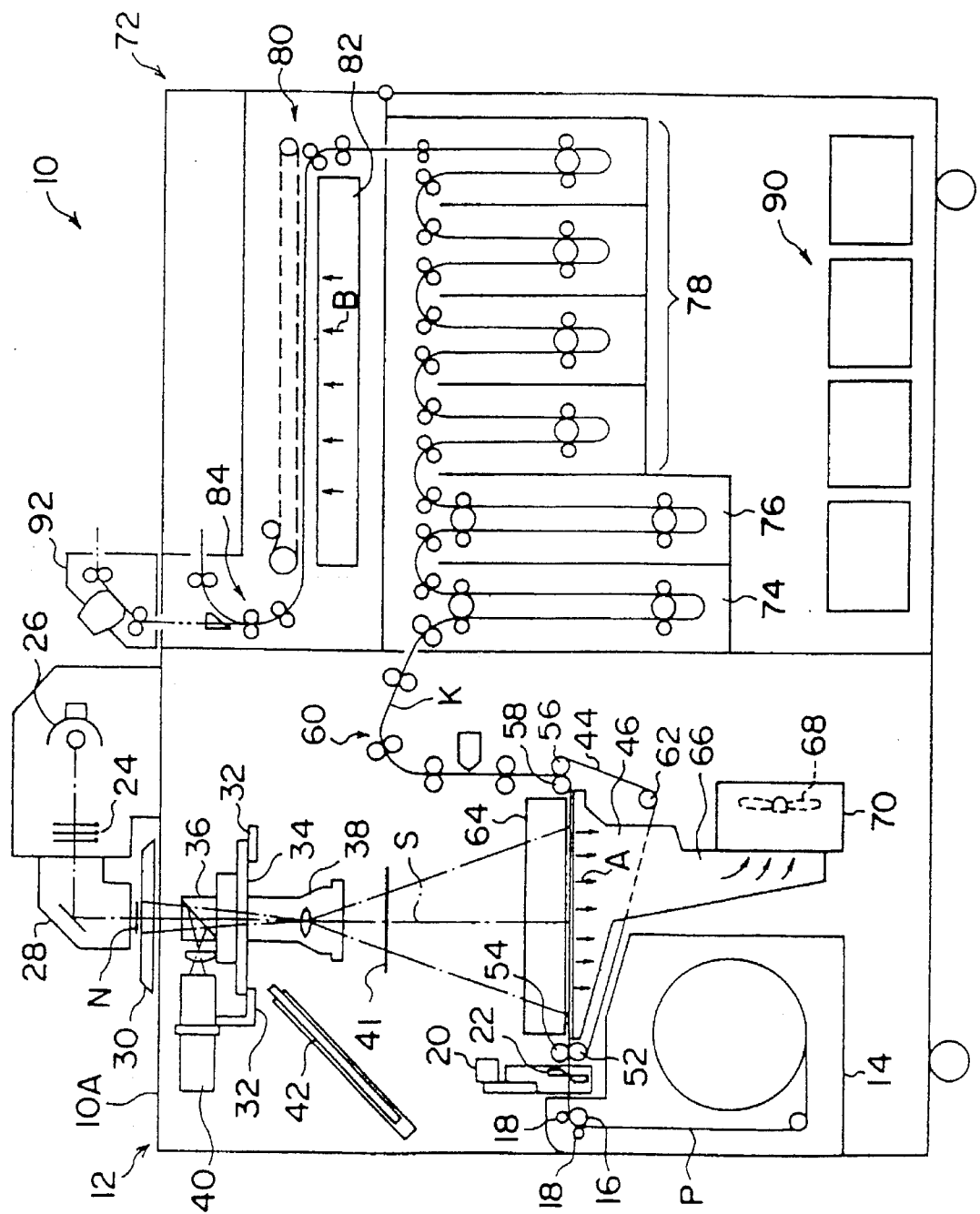
FIG. 1 is a view schematically showing the structure of a printer processor employed in one embodiment of the present invention.

FIG. 1 schematically shows a printer processor 10 employed in the variable mask mechanism according to the embodiment of the present invention. A photographic printing portion 12, which constitutes a printer unit of the printer processor 10, has a structure in which a paper magazine 14 with photographic paper P used as a photosensitive material accommodated therein can be loaded.

A drive roller 16 around which a portion adjacent to the leading end of the photographic paper P is wound, is rotatably supported on the upper and left-upper side of the paper magazine 14 as seen in FIG. 1. The drive roller 16 is rotated in response to the driving force of an unillustrated motor provided within the photographic printing portion 12. A pair of nip rollers 18 is provided at a position opposite to the drive roller 16 with the photographic paper P being nipped therebetween. The photographic paper P is nipped between the drive roller 16 and the nip rollers 18. The drive roller 16 then conveys the photographic paper P to the inside of the photographic printing portion 12.

On the other hand, a cutter 22 formed by a pair of vertically-extending blades and operated by a motor 20 is provided within the photographic printing portion 12. The photographic paper P which is withdrawn from the paper magazine 14 is immediately cut by the cutter 22.

A support table 46 whose upper surface is formed along the horizontal direction (upper and right and left directions as seen in FIG. 1), is provided on the right side of the cutter 22 as seen in FIG. 1, i.e., on the downstream side of the photographic paper P as seen in the direction in which the photographic paper P is conveyed. A winding roller 52 around which an endless belt 44 is wound, is disposed along the horizontal direction (i.e., the direction normal to the paper as seen in FIG. 1) between the support table 46 and the cutter 22. A nip roller 54 for nipping the endless belt 44 between the nip roller 54 and the winding roller 52 is provided on the upper side of the winding roller 52.

A guide roller 56 on which the endless belt 44 is wound, is provided on the downstream side of the support table 46 as seen in the direction in which the photographic paper P is conveyed. A press roller 58 whose lower surface become substantially identical in height to the upper surface of the winding roller 52, is provided at a position adjacent to the guide roller 56. The press roller 58 presses the outer periphery of the endless belt 44.

Namely, the pressed endless belt 44 is shaped in the form of an S letter as shown in FIG. 1. Further, the endless belt 44 is wound around a tension roller 62 on the lower side of the guide roller 56 so as to form an inverse-triangular travel locus. Thereafter, the guide roller 56 is driven and rotated by the driving force generated from the unillustrated motor so that the endless belt 44 is rotated in a clockwise direction as seen in FIG. 1.

On the other hand, the endless belt 44 has a plurality of small through-holes (not shown) defined therein over the entire region thereof. A plurality of through-holes (not shown) are defined in the upper surface of the support table 46 on which a part of the endless belt 44 is placed, so as to correspond to the small through-holes defined in the endless belt 44. Further, the support table 46 has an inner portion defined in hollow form. A pair of communication ducts 66 (only one of which is shown in FIG. 1) formed so as to correspond to transversely-extending ends of the endless belt 44 is connected to the support table 46. The communication ducts 66 bypass the endless belt 44 which passes through the lower side of the support table 46, so as to reach a position below the endless belt 44, followed by coupling to a fan box 70 provided with a suction fan 68.

As shown in FIG. 1, an easel device 64 is provided above the endless belt 44 which moves along the support table 46. When an image with edges is printed onto the photographic paper P, the periphery of the photographic paper P is covered with an unillustrated moving part provided within the easel device 64.

Further, a light diffusion box 28 is provided at a position which is outside casing 10A that forms an outer frame of the printer processor 10 and which is set upright above the easel device 64. A CC filter 24 made of three filters which are cyan (C), magenta (M) and yellow (Y) each inserted into an optical path and movable so as to change a filtering amount, is adjacently disposed on the right side of the light diffusion box 28. Thus, a light beam emitted from a light source 26 provided adjacent to the CC filter 24 passes through the CC filter 24 and is then bent so as to fall perpendicularly while being diffused by the light diffusion box 28. The light beam is transmitted through a negative film N on a negative carrier 30 placed on the upper surface of the casing 10A.

Further, guide rails 32 provided within the photographic printing portion 12 support the support table 34 thereon so that the support table 34 is movable in the horizontal direction (i.e., in the direction normal to the paper as seen in FIG. 1). A prism 36 and a zoom lens 38 are respectively attached to the support plate 34 so as to be disposed in the optical axis S of the light beam.

Accordingly, the light beam, which has passed through the negative film N and serves as exposure light, passes through the prism 36. Thereafter, the light beam passes through the zoom lens 38 which is capable of changing enlargement magnification to form images on the negative film N on photographic paper P which is disposed below the easel device 64.

A density measuring unit 40 comprised of a color filter and a photosensor such as a CCD or the like, for measuring the density of the negative film N is provided within the photographic printing portion 12. The light beam bent in the horizontal direction by the prism 36 is conveyed to the density measuring unit 40. The density measuring unit 40 is electrically connected to a controller 150 (unillustrated in FIG. 1) which sets an exposure correction value at the time of printing and exposure based on data measured by the density measuring unit 40 and data inputted via a keyboard by an operator.

Further, a black shutter 41 for passing therethrough the light beam whose color and intensity are dimmed by the CC filter 24 and which passes through the negative film N, so as to expose images on the negative film N onto photographic paper P for a predetermined time, is provided on the optical path between the zoom lens 38 and the easel device 64.

Since the photographic printing portion 12 is constructed as described above, the photographic paper P delivered from the paper magazine 14 is cut to a desired length by the cutter 22 and is then placed on the endless belt 44, after which it is conveyed to an image printing position corresponding to a position on the optical axis S of the exposure light. Further, the exposure light emitted from the light source 26 is sent to the photographic paper P through the prism 36 and the zoom lens 38 or the like. When the black shutter 41 is held open for the predetermined time, the exposure light reaches the photographic paper P so as to print the images recorded on the negative film N onto the photographic paper P. A portion of the photographic paper P onto which the images have been printed, is obtained as an image portion. Namely, the light beam is transmitted by a distance from the density measuring unit 40 to the photographic paper P spaced by an optical path different in length from an optical path extending to the density measuring unit 40.

At this time, air in the support table 46 is released from within a loop of the endless belt 44 to the transversely-extending ends of the endless belt 44 via the communication ducts 66 and is sucked by the suction fan 68 so as to be blown to the outside. Therefore, the inside of the support table 46 is brought to negative pressure. The negative pressure is applied to the photographic paper P on the endless belt 44 via the through-holes defined in the support table 46 and the small through-holes defined in the endless belt 44 so that portions of the photographic paper P is sucked into the endless belt 44 as indicated by arrow A in FIG. 1. Thus, since the portions of photographic paper P is sucked into the endless belt 44 without being simply placed on the endless belt 44, the photographic paper P is reliably conveyed by the endless belt 44 and is horizontally disposed at the image printing position.

Further, the photographic paper P on which the images have been printed, is held between the guide roller 56 and the press roller 58 and a photographic-paper conveying direction is changed from the horizontal direction to the vertical direction to feed the photographic paper P in the vertical direction. Thereafter, the photographic paper P is conveyed to a processor unit 72 for applying development, bleaching/fixing, washing and drying to the photographic paper P through a conveying path 60 formed by a plurality of pairs of rollers as represented by a path K showing a path for conveying the photographic paper P.

Thus, the processing for printing/exposing one-frame images on the negative film N onto the photographic paper P is completed. By repeating such processing, the photographic paper P, which has been subjected to the above processing, is successively conveyed to the processor unit 72 one by one.

A developer is stored in a developer tank 74 provided within the processor unit 72. The photographic paper P is immersed into the developer so as to subject it to development. The developed photographic paper P is next conveyed to a bleaching/fixing tank 76 provided adjacent to the developer tank 74. The bleaching/fixing tank 76 contains a bleaching and fixing liquid therein. The photographic paper P is immersed into the bleaching and fixing liquid so as to subject it to bleaching and fixing. The photographic paper P, which has been subjected to the bleaching and fixing process, is conveyed to a washing unit 78 adjacent to the bleaching/fixing tank 76. The washing unit 78 is made up of a plurality of washing tanks with washing water stored therein. The photographic paper P is immersed into the washing water contained in the washing tanks so as to subject it to a washing process. A developing replenisher, a bleaching/fixing replenisher and a washing replenisher are respectively supplied to the developer tank 74, the bleaching/fixing tank 76 and the washing tanks from a plurality of replenishing tanks 90 provided within the processor unit 72 so that they are replenished with their corresponding replenishers.

The photographic paper P, which has been subjected to the washing process, is conveyed to a drying unit 80 provide above the washing unit 78. In the drying unit 80, the photographic paper P is subjected to and dried by hot air blown along the direction indicated by arrow B from a chamber 82 disposed on the lower side of the path for conveying the photographic paper P.

A conveying path 84 formed by a plurality of pairs of rollers is provided on the downstream side of the drying unit 80 as seen in the direction in which the photographic paper P is conveyed. Therefore, the photographic paper P, which has been subjected to the drying process and successively ejected from the drying unit 80, is discharged to the outside of the printer processor 10 while being held by the plurality of pairs of rollers so as to be stacked on one another.

If the photographic paper P, which has been subjected to the respective processes such as development, bleaching/fixing, washing, etc., is a special photographic paper for testing whether a developer is degraded, it is then conveyed to a densitometer 92 provided above the conveying path 84, where the density of the photographic paper P is measured.

When a special enlargement magnification that the zoom lens 38 in the photographic printing portion 12 cannot cope with, is required upon printing/exposing the photographic paper P, the support plate 34 is displaced in the horizontal direction (i.e., in the direction orthogonal to the paper as seen in FIG. 1) so as to take the prism 36 and the zoom lens 38 out of the optical axis S of the light beam. Further, an unillustrated lens is placed on the optical axis S of the light beam and a photometric mirror 42 provided within the photographic printing portion 12 is shifted onto the optical axis S of the light beam.

The variable mask mechanism according to the present embodiment, which has been mounted on the negative carrier 30, will now be described.

Figure 2:
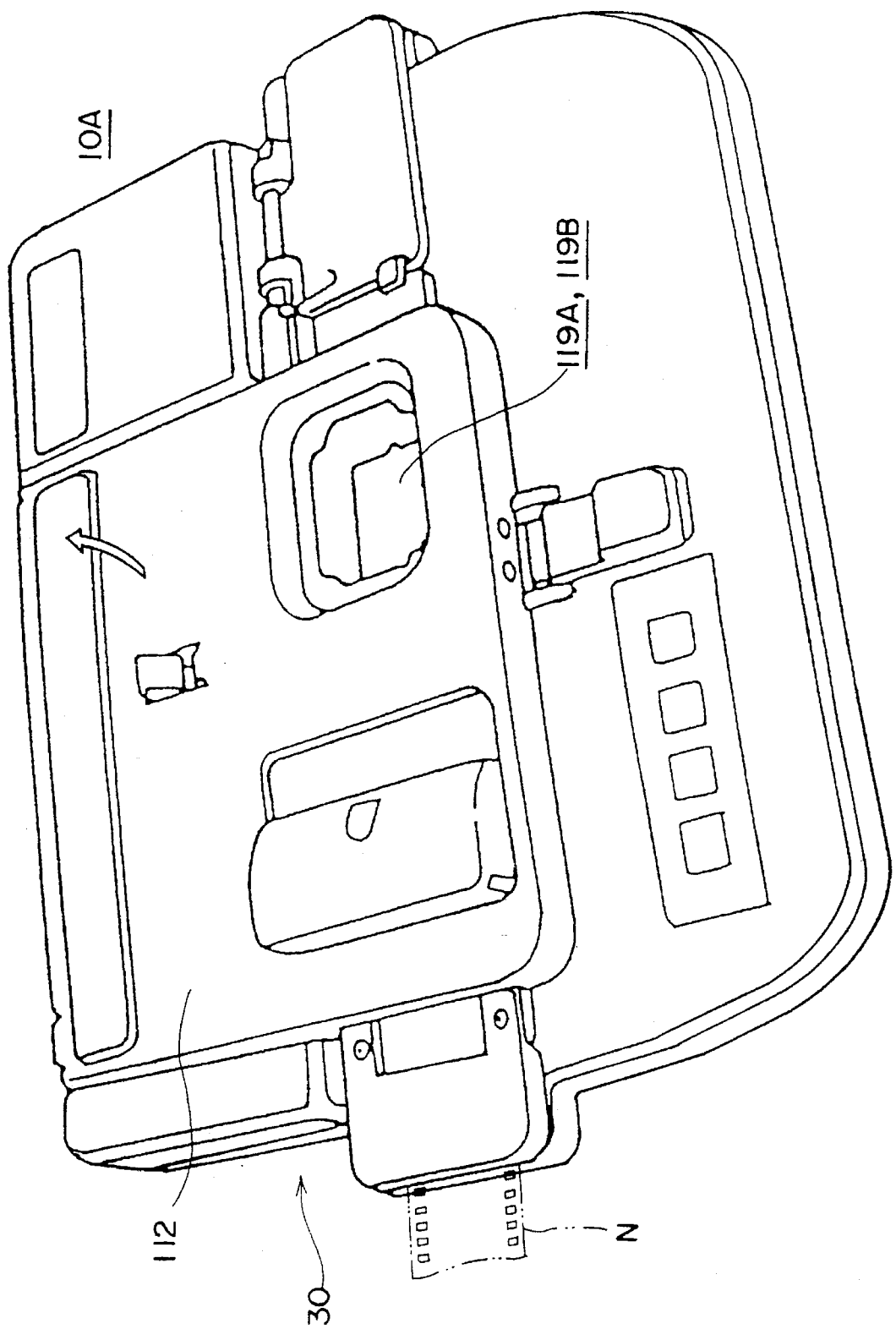
FIG. 2 is a perspective view of a negative carrier employed in the embodiment of the present invention.
Figure 3:
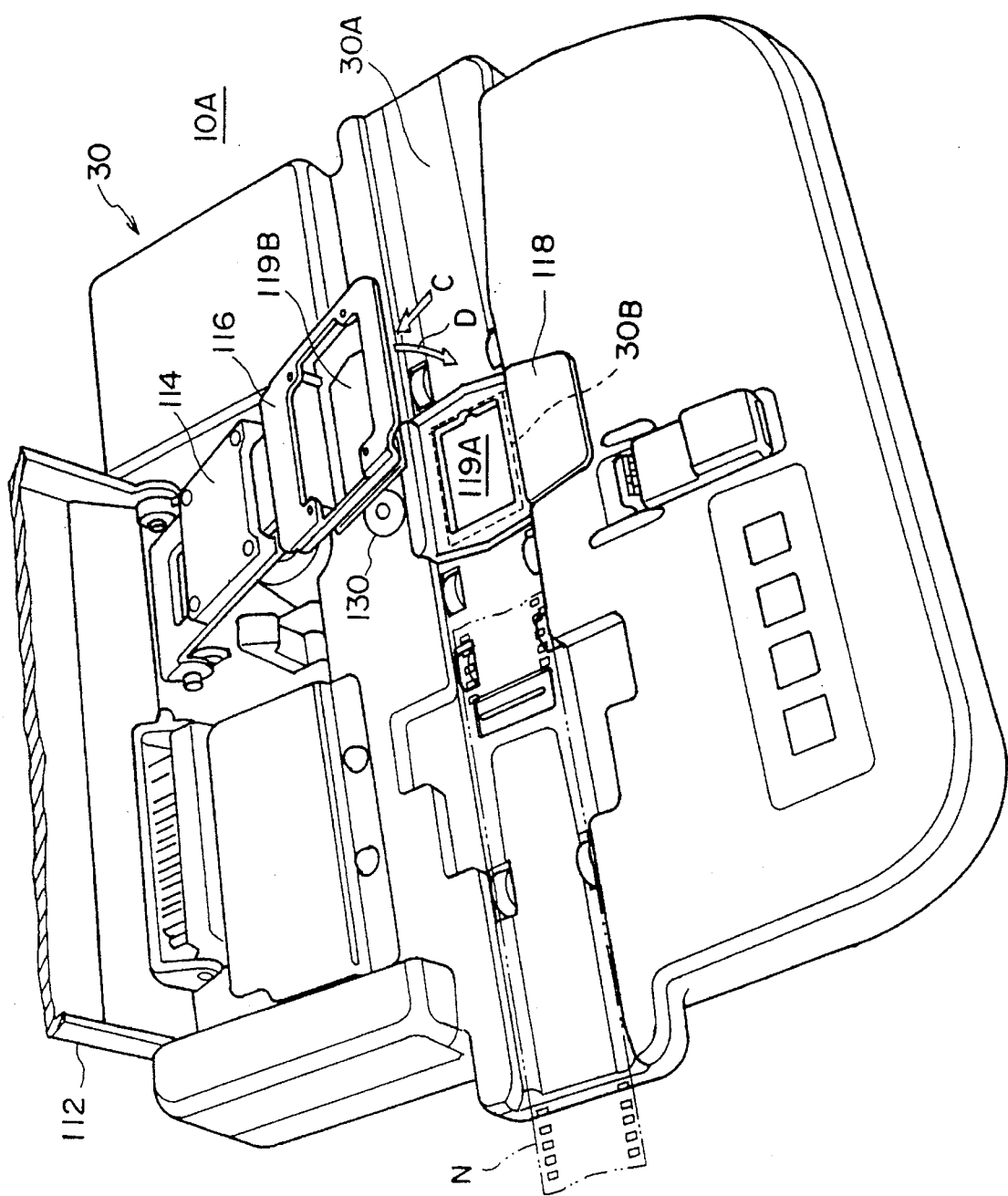
FIG. 3 is a perspective view of the negative carrier shown in FIG. 2 and is a view showing a state in which a cover of the negative carrier is open.

As shown in FIG. 2, an openable and closable cover 112 is attached to the negative carrier 30 on the casing 10A. When the cover 112 is opened as shown in FIG. 3, a negative film passage portion 30A shaped in groove form and for causing the negative film N to pass therethrough appears. A pressing plate (also called an upper negative mask) 116 inserted into and attached to a holder 114 rotatably mounted on the negative carrier 30, along the direction indicated by arrow C, and a mask (also called an under negative mask) 118 provided on the negative film passage portion 30A are provided below the cover 112. A window 119A having an area slightly larger than that of a full-size image frame N1 (shown in FIG. 12) corresponding to the maximum screen size of the negative film N is defined in the mask 118. A window 119B having an area slightly larger than that of the same image frame N1 is defined in the pressing plate 116.

A rectangular-shaped aperture or opening 30B larger than the window 119A of the mask 118 and the window 119B of the pressing plate 116 is provided at a position where the mask 118 is mounted on the negative carrier 30. Thus, when the holder 114 is rotated in the direction indicated by arrow D so that the pressing plate 116 is brought into contact with the mask 118, the light beam emitted from the light source 26 can pass through the negative film N positioned between the window 119A of the mask 118 and the window 119B of the pressing plate 116.

Figure 4:
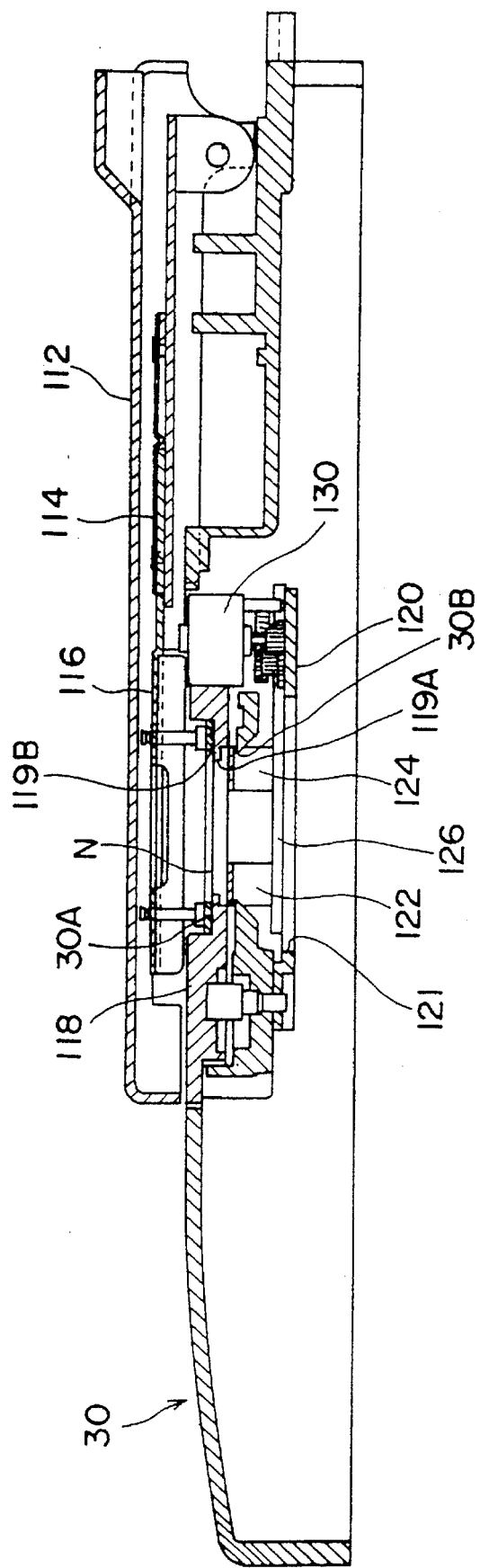
FIG. 4 is a cross-sectional view of the negative carrier shown in FIG. 2.
Figure 6:
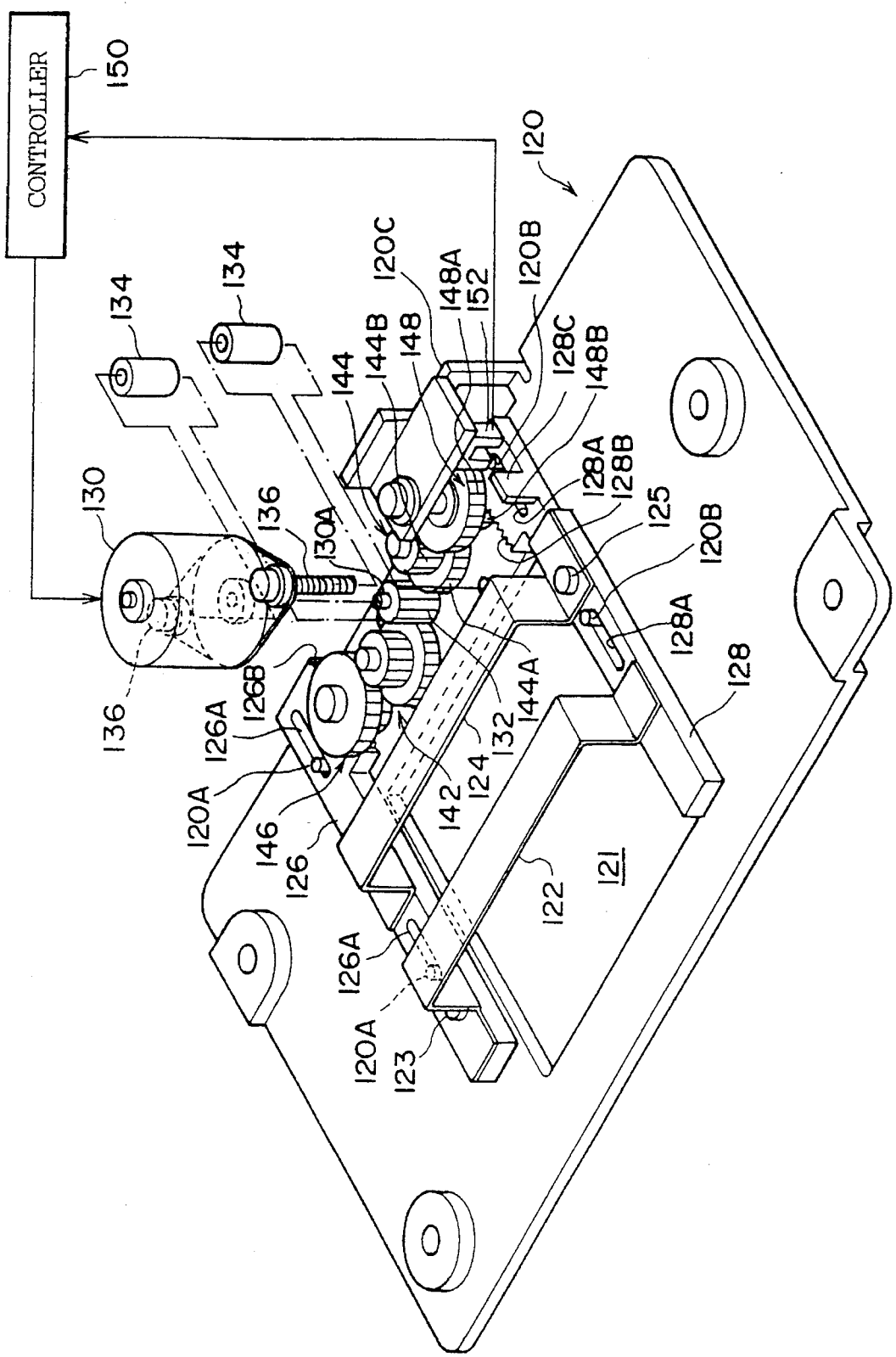
FIG. 6 is a perspective view of the variable mask mechanism shown in FIG. 5.

As shown in FIG. 4, a support table 120 having a rectangular-shaped window 121 larger than the aperture 30B, which is defined centrally therein so as not to interfere with the entrance of the light beam emitted from the light source 26, is screw-mounted to the negative carrier 30 with unillustrated bolts. As shown in FIG. 6, first and second slide members 126 and 128 are provided on the support table 120 with the window 121 interposed therebetween.

Figure 5:
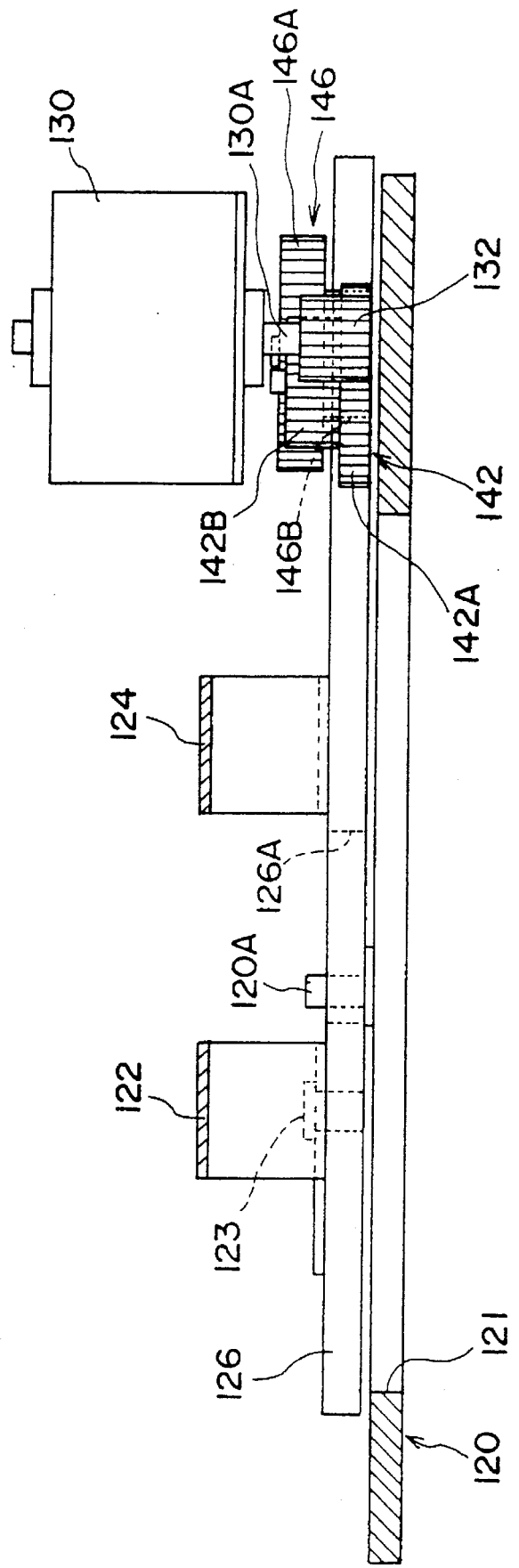
FIG. 5 is an enlarged cross-sectional view of a variable mask mechanism showing the embodiment of the present invention.

Further, as shown in FIGS. 5 and 6, a base end of a mask member 122 made of a slender plate member is screw-mounted to a leading end portion of the first slide member 126 with a bolt 123. The first slide member 126 has a pair of elongated holes 126A each formed lengthwise along the longitudinal direction of the first slide member 126. A pair of pins 120A vertically planted in the support table 120 extends through the pair of elongated holes 126A. Therefore, the first slide member 126 and the mask member 122 can be reciprocated along the longitudinal direction of the first slide member 126.

On the other hand, a base end of a mask member 124 formed of the same slender plate member as that for the mask member 122 is screw-mounted to the midpoint of the second slide member 128 with a bolt 125. The second slide member 128 has a pair of elongated holes 128A each defined lengthwise along the longitudinal direction of the second slide member 128. A pair of pills 120B vertically embedded in the support table 120 extends through the pair of elongated holes 128A. Therefore, the second slide member 128 and the mask member 124 can be reciprocated along the longitudinal direction of the second slide member 128.

Further, mutually-opposed racks 126B and 128B are provided on the base end sides of the slide members 126 and 128 respectively. The mask member 122 screw-mounted on the first slide member 126 extends to the second slide member 128. A leading end of the mask member 122 is guided such as to contact the second slide member 128. The mask member 124 screw-mounted on the second slide member 128 extends to the first slide member 126. A leading end of the mask member 124 is guided such as to contact the first slide member 126. Since the mask 118 is nipped between the mask leaves 122 and 124 and the negative film N, a predetermined space is defined therebetween as shown in FIG. 4.

A motor 130, which is a pulse motor, is screw-mounted to the support table 120 by a pair of bolts 136 with a pair of spacers 134 interposed therebetween. A drive gear 132 is fixedly mounted to a rotatable shaft 130A of the motor 130.

As shown in FIGS. 5 and 6, a pair of first follow-up gears 142 and 144, the former of which comprises a large toothed wheel 144A brought into engagement with the drive gear 132 and a small toothed wheel 144B and the latter of which comprises a large toothed wheel 142A engaged with the drive gear 132 and a small toothed wheel 142B, is rotatably supported by the support table 120. Further, a pair of second follow-up gears 146 and 148, which respectively consist of large toothed wheels 146A and 148A respectively engaged with the small toothed wheels 142B and 144B, and small toothed wheels 146B and 148B, is rotatably supported by the support table 120.

The small toothed wheels 146B and 148B of the pair of second follow-up gears 146 and 148 are brought into engagement with their corresponding racks 126B and 128B of the pair of slide members 126 and 128.

Accordingly, the motor 130, the drive gear 132, the first follow-up gears 142 and 144 and the second follow-up gears 146 and 148 serve as a drive source.

Thus, the slide members 126 and 128 are mutually moved forward and backward alternately in a reverse direction along their longitudinal directions by the rotation of the motor 130 decelerated by the follow-up gears 142, 144, 146 and 148.

Further, as shown in FIGS. 6 an 7, a wall portion 120C whose heading end is bent in the horizontal direction, is provided at one end of the support table 120 so as to extend in the vertical direction. A transmissive photosensor 152 is provided on the bent leading end side of the wall portion 120. The second slide member 128 has a detected portion 128C bent in an upward direction. When the detected portion 128C passes within the transmissive photosensor 152, the position of the second slide member 128 can be detected.

Thus, when the motor 130 is reversed after the detected portion 128C has entered into the transmissive photosensor 152, for example, the second slide member 128 is moved so as to prevent a transmitted-light in the transmissive photosensor 152 from being screened by the detected portion 128C. When the transmitted-light is free from screening, positions where the slide members 126 and 128 and the mask members 122 and 124 and the hike exist, are brought to the positions set as the origins, whereby the positions of these members can be recognized.

Figure 7:
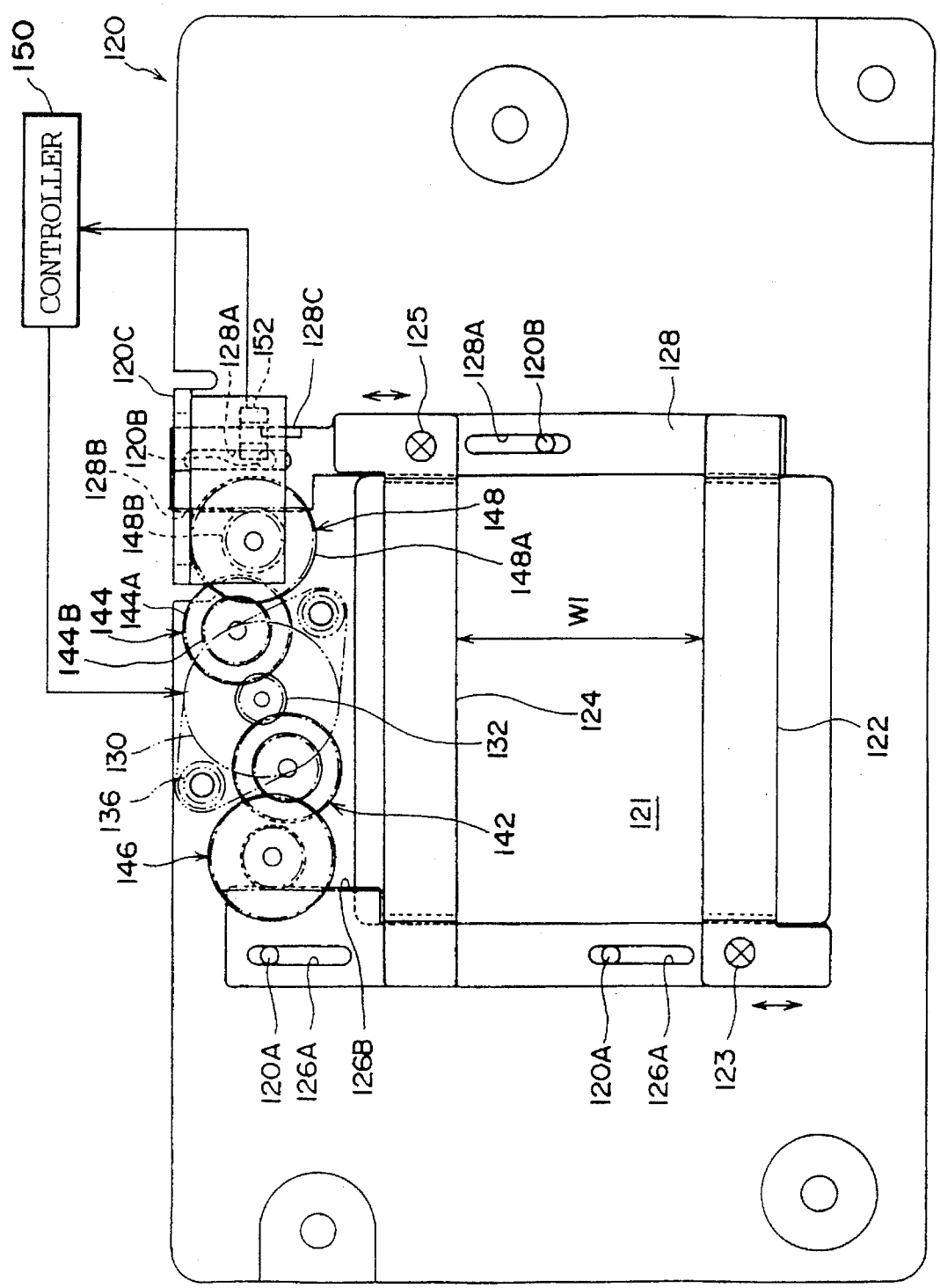
FIG. 7 is a plan view of the variable mask mechanism shown in FIG. 5 and is a view showing a state corresponding to a full-size image frame.

Further, the motor 130 is electrically connected to the controller 150 so as to be driven and rotated via an unillustrated mask-alignment key operated by an operator. Thus, when the key is operated to rotate the motor 130, the first follow-up gears 142 and 144 and the second follow-up gears 146 and 148 are rotated. As a result, the pair of slide members 126 and 128, which are respectively provided with the racks 126B and 128B and engaged with the second follow-up gears 146 and 148, are mutually moved in the reverse direction. With this movement, the mask members 122 and 124 are mutually displaced in the reverse direction along upward and downward directions as seen in FIG. 7 so as to perform an opening and closing operation.

Figure 9:
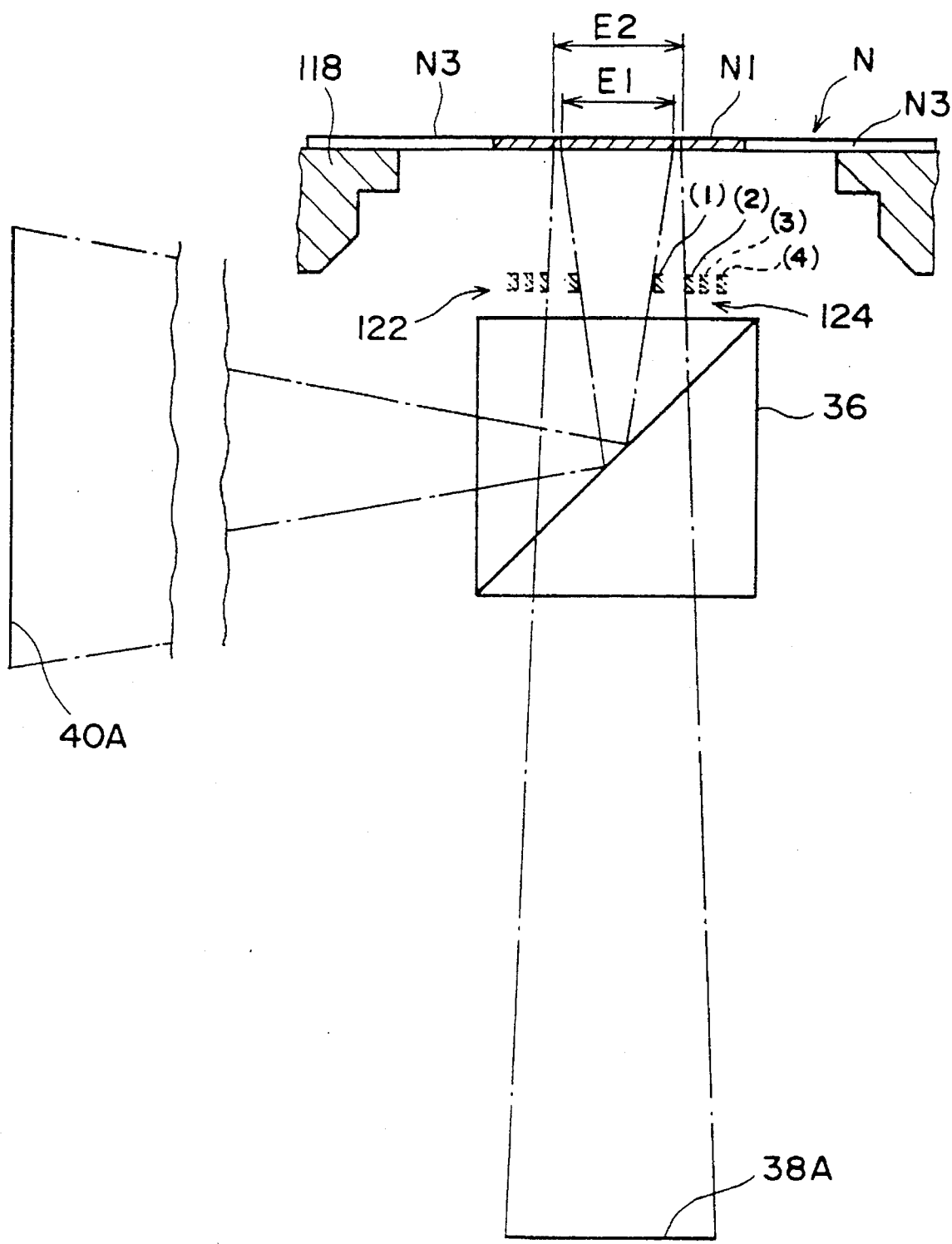
FIG. 9 is a conceptual view illustrating optical paths of exposure light beams falling within an effective area, which pass through the variable mask mechanism shown in FIG. 5.

On the other hand, the prism 36 provided below the negative carrier 30 divides an exposure light beam transmitted through the negative film N into a light beam on the side of the density measuring unit 40 disposed on the left side of the prism 36 as seen in FIGS. 1 and 9 and a light beam on the side of the zoom lens 38 disposed below the prism 36. At this time, a distance between the prism 36 and a lens 40A (linearly shown in FIGS. 9 and 10) on the incident side of the density measuring unit 40 is normally different from a distance between the prism 36 and a lens 38A (linearly shown in FIGS. 9 and 10) on the incident side of the zoom lens 38.

As illustrated in FIG. 9 showing a full-size image frame N1 as an example, an actually-photometered effective area E1 and an actually-exposed effective area E2 of the image frame N1 with images recorded on the negative film N are set so as to become slightly smaller than the total area of the image frame N1. An outer peripheral portion N3 corresponding to a portion of the negative film N, which exists outside the image frame N1, is optically transparent.

It is therefore necessary to reliably cause the light beam emitted from the light source 26, which has passed within the photometered effective area E1 and the exposed effective area E2, to fall on the lenses 40A and 38A of the density measuring unit 40 and the zoom lens 38. On the other hand, the light beam emitted from the light source 26, which has passed through the transparent outer peripheral portion N3 of the negative film N, needs to be prevented from falling upon the lenses 40A and 38A of the density measuring unit 40 and the zoom lens 38.

Figure 10:
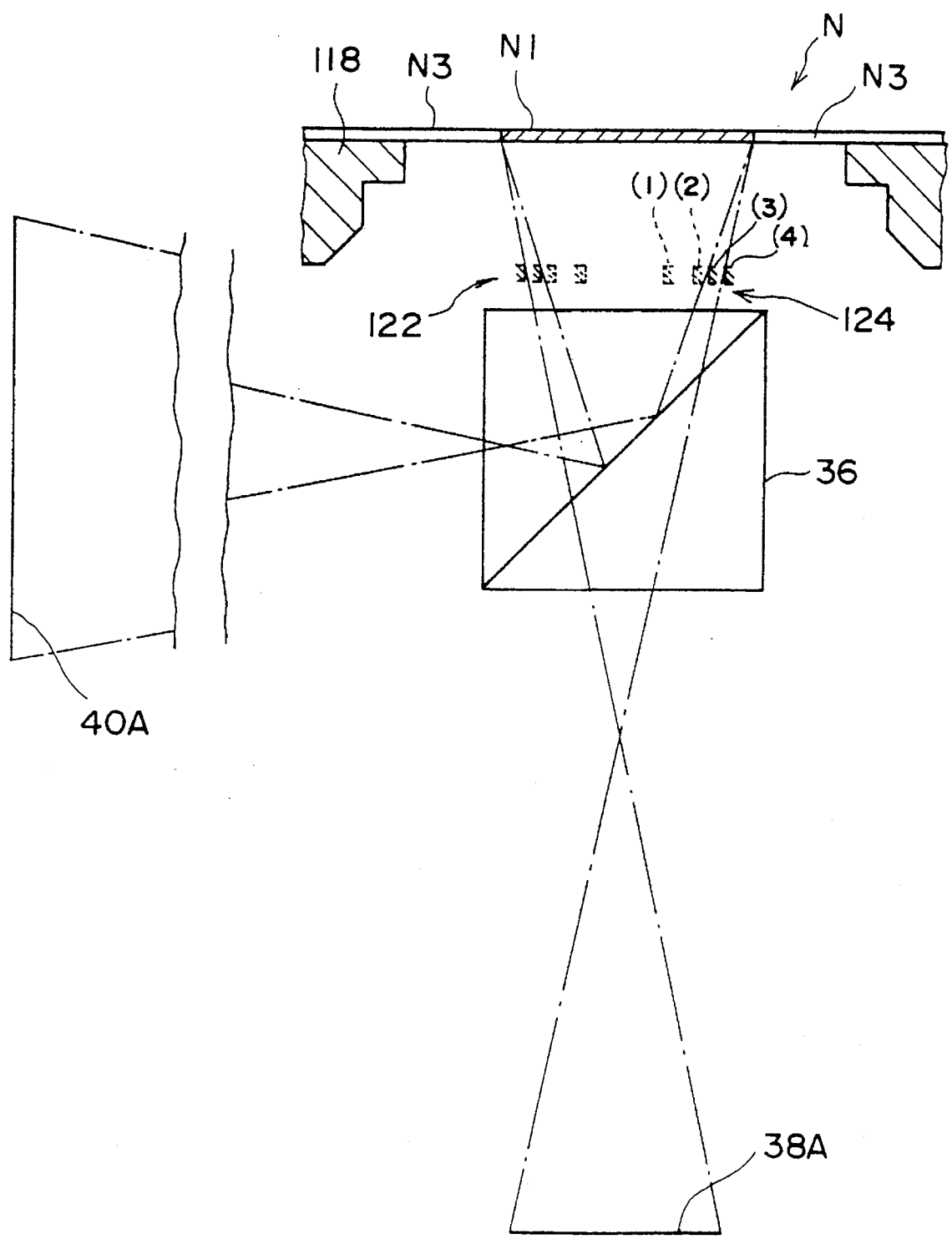
FIG. 10 is a conceptual view showing optical paths of light beams falling on an image-frame outer peripheral portion, which pass through the variable mask mechanism shown in FIG. 5.

Namely, it is necessary to place inner ends corresponding to mutually-opposed portions of the pair of mask leaves 122 and 124 outside from positions (1) upon photometry as shown in FIG. 9 so that the light beam transmitted through the effective areas E1 and E2 reliably enters into the lenses 40A and 38A. Similarly, it is necessary to place the inner ends of the pair of mask leaves 122 and 124 outside from positions (2) upon exposure. It is necessary to place the inner ends of the pair of mask leaves 122 and 124 inside from positions (3) upon photometry as shown in FIG. 10 so that the light beam transmitted through the outer peripheral portion N3 is prevented from falling upon the lenses 40A and 38A. Similarly, it is necessary to place the inner ends of the pair of mask leaves 122 and 124 inside from positions (4) upon exposure.

Figure 11:
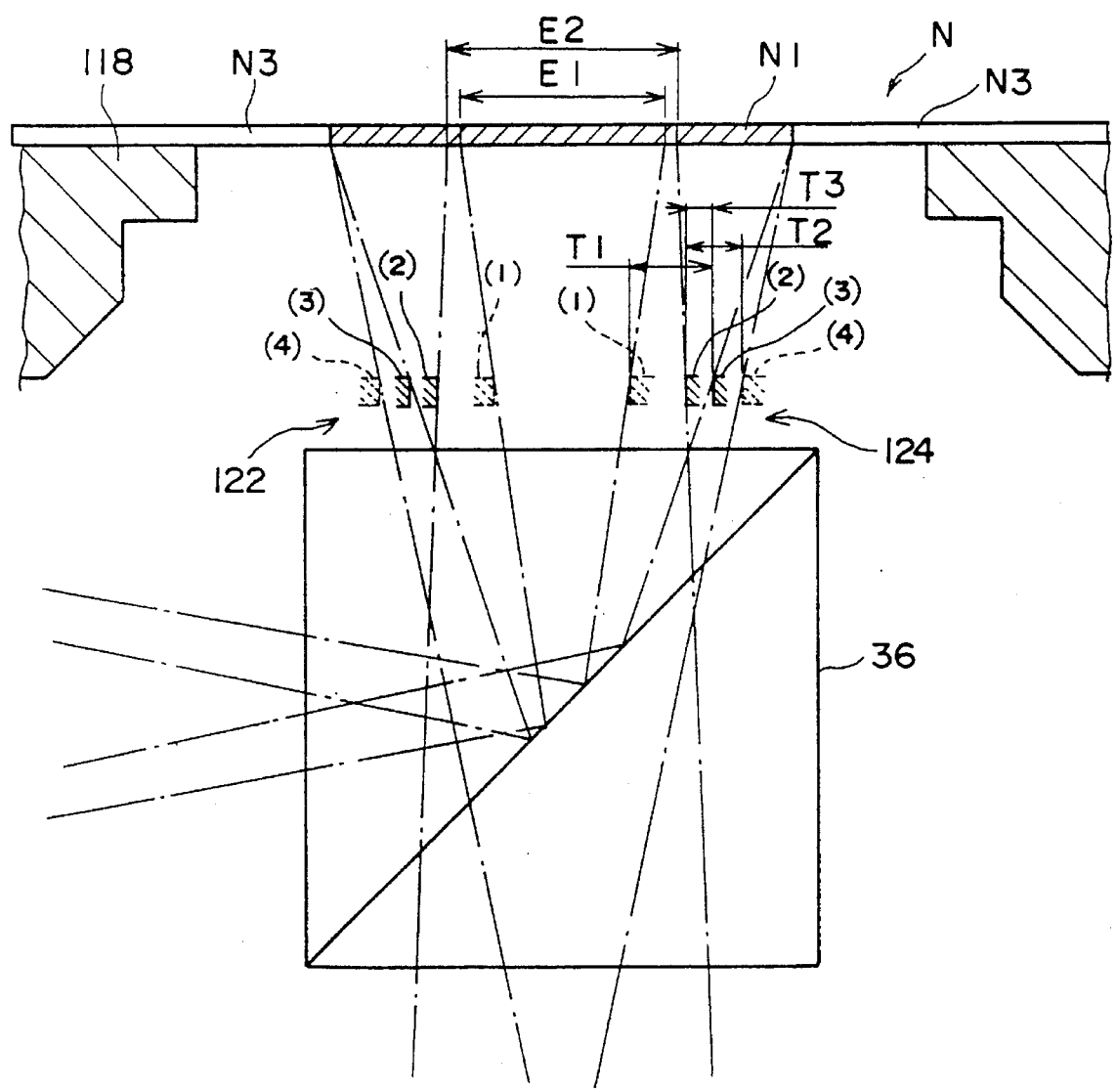
FIG. 11 is a conceptual view depicting, in an enlarged form, the optical paths of the light beams which pass through the variable mask mechanism shown in FIG. 5.

Thus, when the intensity of the light beam is measured by the density measuring unit 40, it is necessary to displace the mask leaves 122 and 124 under the action of rotation of the motor 130 in such a manner that the inner ends of the mask leaves 122 and 124 respectively fall within ranges between the positions (1) and the positions (3) as shown in FIG. 11. Upon printing/exposing images on photographic paper P, it is necessary to displace the mask leaves 122 and 124 by the rotation of the motor 130 so that the inner ends of the mask leaves 122 and 124 respectively fall within ranges between the positions (2) and the positions (4).

The operation of the present embodiment at the time of photometry and exposure will now be described.

First, an operator confirms whether an image frame on a negative film N conveyed onto the negative carrier 30 is a full-size image frame N1 or a panorama-size image frame N2. If the image frame is found to be the image frame N1, for example, the controller 150 is then set to a mode corresponding to the image frame N1 via the unillustrated mask alignment key operated by the operator.

Next, the controller 150 controls the operation of the motor 130 so that the mask leaves 122 and 124 that partially block the light beam emitted from the light source 26, are respectively aligned with position ranges between the positions (1) and (3), which are of ranges in which the densities of the images on the negative film N can be measured. In the aligned condition, the density measuring unit 40 measures the density of an image on the image frame N1. Thereafter, the mask leaves 122 and 124 are respectively displaced so as to be aligned with position ranges between the positions (2) and (4), which are of ranges in which images on a negative film N can be exposed onto photographic paper P located in an image printing position. Thus, the mask leaves 122 and 124 substantially change the amount of opening of the aperture 30B to expose the images on the negative film N onto the photographic paper P provided on the optical axis S corresponding to the optical path different from the optical path extending to the density measuring unit 40.

Thus, since the mask leaves 122 and 124 are changed in position upon photometry and exposure, the mask leaves 122 and 124 may stop moving within a permissible range T1 upon photometry and a permissible range T2 upon exposure respectively. On the other hand, when the degree of opening of each of the mask leaves 122 and 124 remains unchanged between on- photometry and on-exposure, the mask leaves 122 and 124 must stop moving within a permissible range T3 corresponding to a range at which the permissible ranges T1 and T2 overlap each other. Thus, according to the present embodiment, the permissible position range T1 and T2 of the mask leaves 122 and 124 at the time of photometry and exposure are respectively expanded. Hence each of the mask leaves 122 and 124 does not need high positioning accuracy and the accuracy of stopping the mask leaves 122 and 124 can be sufficiently ensured.

Namely, if the permissible range T1, the permissible range T2 and the range at which the two permissible ranges T1 and T2 overlap each other are represented as 1.6 mm, 1.4 mm and 0.7 mm respectively, then 0.7 mm is given as the permissible range T3. Thus, when the degree of opening of each of the mask leaves 122 and 124 remains unchanged, only 0.7 mm is obtained as the permissible range. According to the present embodiment contrary to this, each mask members 122 and 124 may stop moving within a 1.6 mm permissible range upon photometry and may stop moving within a 1.4 mm permissible range upon exposure. It is thus unnecessary to position the mask leaves 122 and 124 with accuracy higher than required. Further, the variable mask mechanism can be reduced in manufacturing cost.

A method of exposing images on photographic paper P after an operation for moving each of the mask leaves 122 and 124 to the position firstly set as the origin has been inserted between on-photometry and on-exposure, is considered.

Even if a backlash or the like incidentally occurs in the mesh of the drive gear 132, the follow-up gears 142, 144, 146 and 148 and the racks 126B and 128B of the variable mask mechanism, the position accuracy of stopping the mask leaves 122 and 124 upon photometry and printing/exposure can be easier ensured.

On the other hand, when the size of an image frame of the negative film N is changed, the negative carrier 30 is operated according to its change in the following manner.

When the image frame size is changed, the operator operates the mask alignment key. When this key is operated, the motor 130 shown in FIG. 6 is driven and rotated to mutually displace the mask leaves 122 and 124 in the reverse direction. In a state in which the amount of opening of the aperture 30B of the negative carrier 30 has been adjusted, the images on the negative film N are exposed onto the photographic paper P located in the image printing position set within the printer-processor 10.

Figure 8:
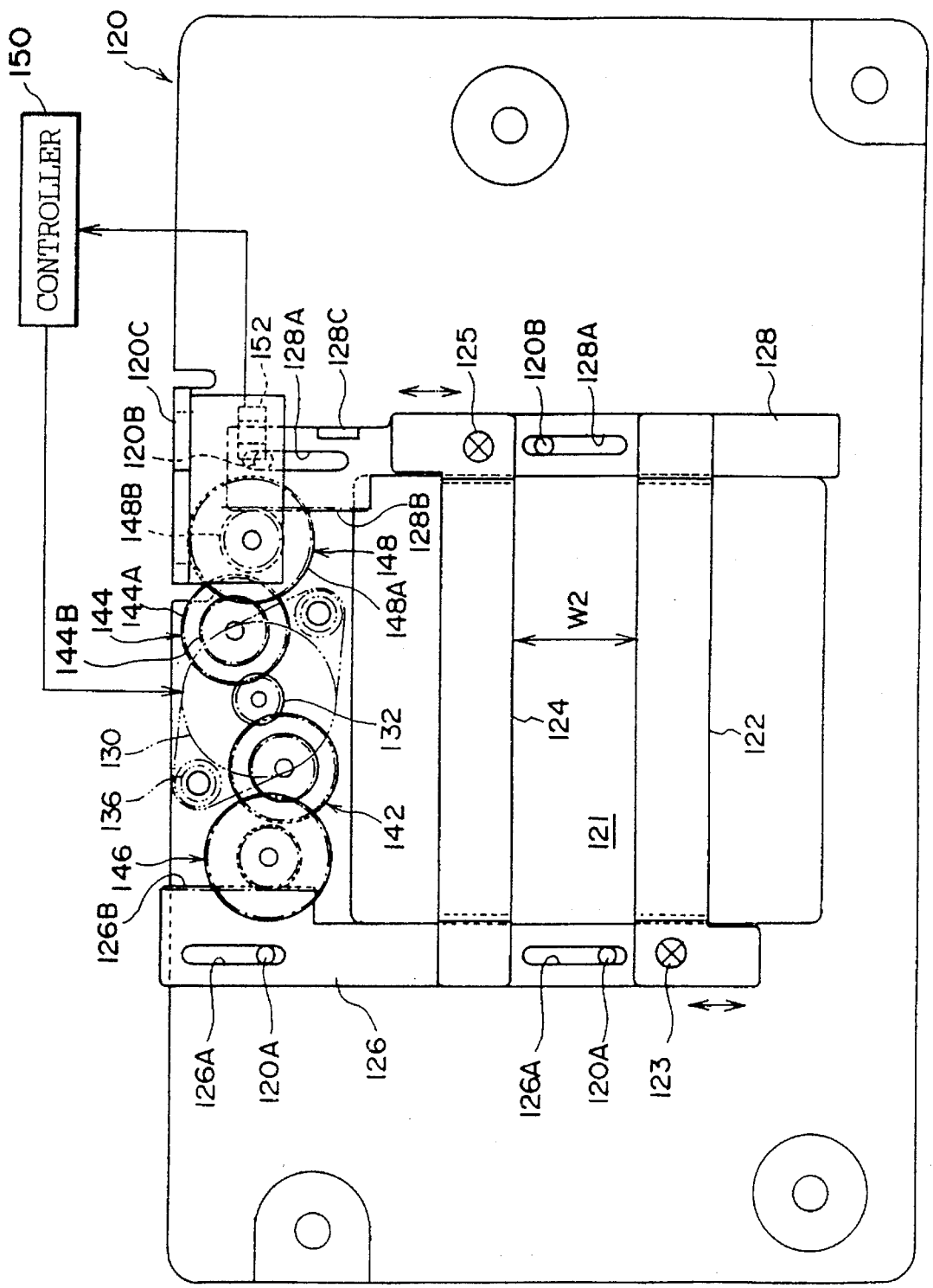
FIG. 8 is a plan view of the variable mask mechanism shown in FIG. 5 and is a view illustrating a state corresponding to a panorama-size image frame.
Figure 12:
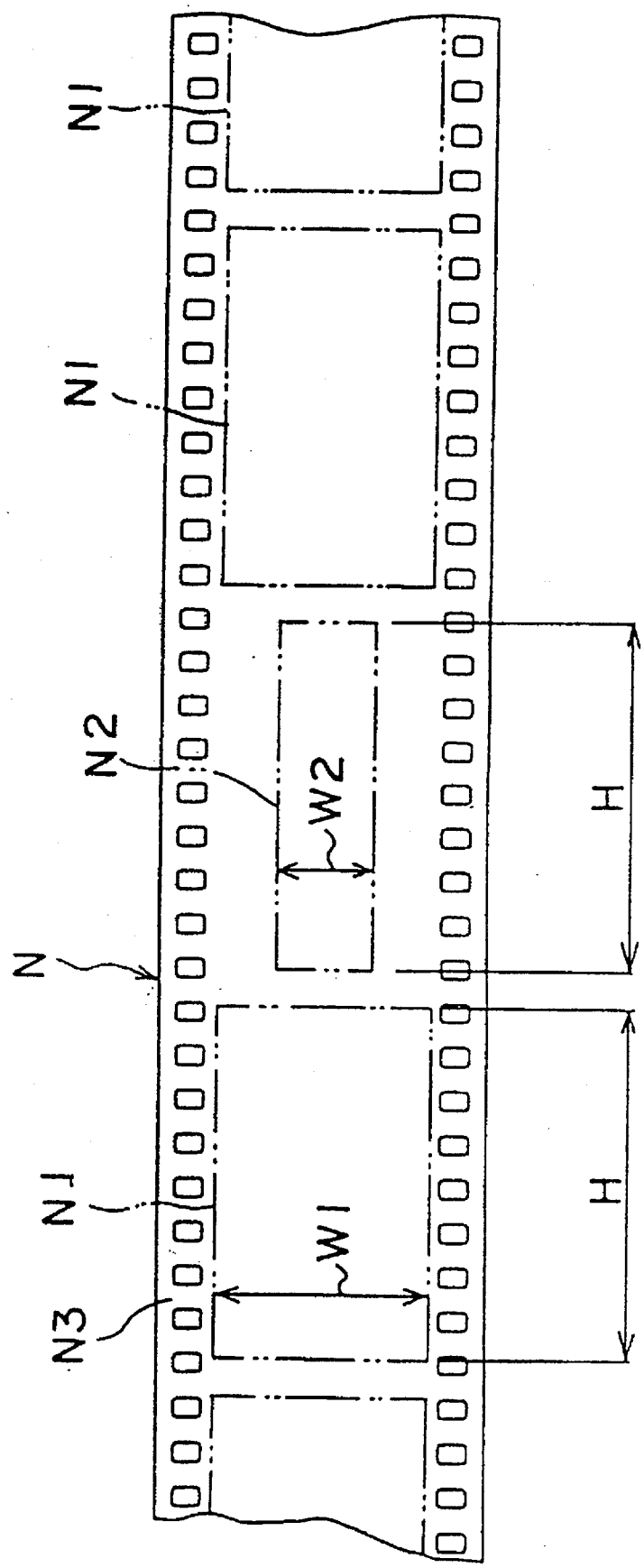
FIG. 12 is a view for describing the type of image frame on a negative film.

For example, when the type of image frame on the negative film N is changed as shown in FIG. 12 and the amount of opening is adjusted from an amount of opening W1 (26 mm) corresponding to the full-size image frame N1 (26×36 mm) shown in FIG. 7 to an amount of opening W2 (13 mm) corresponding to the panorama-size image frame N2 (13×36 mm) shown in FIG. 8, the operator operates the mask alignment key. As a result, the motor 130 is driven and rotated to open and close the mask leaves 122 and 124 so that the amount of opening of the aperture 30B is adjusted to the amount of opening W2.

Thus, a print size corresponding to a full size of 89×127 mm is changed to a print size corresponding to a panorama size of 89×254 mm and the images are exposed onto the photographic paper P in this print size. Upon change in size, enlargement magnification for printing and exposure is changed as a matter of course. Even in the case of the panorama-size image frame N2, the positions of the mask leaves 122 and 124 are changed between on-photometry and on-exposure in a manner similar to the full-size image frame N1.

In the abovementioned embodiment, the amount of opening is changed via the keyboard operated by the operator. However, the mask leaves 122 and 124 may be opened and closed by, for example, detecting an image frame size with a sensor and automatically driving and rotating the motor 130. Further, as a material for the mask leaves 122 and 124, a metal such as stainless steel or the like, or a synthetic resin or the like is considered optimum in terms of processability and manufacturing cost.

On the other hand, the aforementioned embodiment has been described on the understanding that the two types of full-size and panorama-size image frames different in aspect ratio from each other exist on the negative film N. It is however needless to say that the present invention can be applied even when three or more types of image frames different in aspect ratio from each other exist on the negative film N. In the aforementioned embodiment, the photometered effective area E1 and the exposed effective area E2 are different in size from each other but may be equal in size. The variable mask mechanism is not necessarily limited to the structure, shape, etc. employed in the aforementioned embodiment. It is needless to say that a mechanism for converting rotational motion into linear motion using a cam or the like may be used as an alternative to the variable mask mechanism according to the aforementioned embodiment.

As has been described above, the method of positioning the mask using the variable mask mechanism according to the present invention and the variable mask mechanism according to the present invention can bring about excellent effects in that the manufacturing cost of the variable mask mechanism can be reduced and the amount of opening can be easily changed according to the change in the size of the image frame on the negative film.

Having now fully described the invention, it will be apparent to those skilled in the art that many changes and modifications can be made without departing from the spirit or scope of the invention as set forth herein.

What is claimed is:

1. A method of positioning a mask using a variable mask mechanism capable of displacing the mask for partially blocking a light beam for exposing a photosensitive material when images on a negative film are exposed onto the photosensitive material and of changing an amount of opening of an aperture through which the light beam passes, said method comprising the step of:

measuring a density of each image by a density measuring unit in a state in which the mask is in alignment with a range in which the density of each image on the negative film is measurable; and thereafter shifting the mask to a range in which the images on the negative film are capable of being exposed, to change the amount of opening of the aperture, thereby exposing the photosensitive material provided on an optical path different from an optical path extending to the density measuring unit.

2. A method according to claim 1, wherein when the density of each image is measured, the optical path is bent to transmit the light beam to the density measuring unit.

3. A method according to claim 1, wherein a density measuring unit having a color filter and a photosensor is used to measure the density of each image.

4. A method according to claim 1, wherein when the mask is brought into alignment with the range in which the density of each image is measurable, an area on the negative film to be photometered is set smaller than an area of an image frame with images recorded thereon so as to measure the density of the image.

5. A method according to claim 1, wherein when the photosensitive material is exposed, the mask is shifted to the range in which the images on the negative film are capable of being exposed, to print and expose the photosensitive material located in a position of an optical path different in length from an optical path extending to the density measuring unit.

6. A method according to claim 1, wherein when the photosensitive material is exposed, the light beam is sent to the photosensitive material with the optical path thereof as linear.

7. A method of positioning a mask using a variable mask mechanism capable of displacing the mask for partially blocking a light beam for exposing a photosensitive material when images on a negative film are exposed onto the photosensitive material and of changing an amount of opening of an aperture through which the light beam passes, said method comprising the step of:

measuring a density of each image by a density measuring unit in a state in which the mask is in alignment with a range in which the density of each image on the negative film is measurable;

temporarily shifting the mask to a position set as an origin; and thereafter displacing the mask to a range in which the images on the negative film are capable of being exposed, to change the amount of opening of the aperture, thereby exposing the photosensitive material provided on an optical path different from an optical path extending to the density measuring unit.

8. A method according to claim 7, wherein when the density of each image is measured, the optical path is bent to transmit the light beam to the density measuring unit.

9. A method according to claim 7, wherein when the density of each image is measured, the optical path is bent by an optical-path branch prism to transmit the light beam to the density measuring unit.

10. A method according to claim 7, wherein when the mask is shifted to the position set as the origin, a sensor capable of detecting the mask detects whether the mask exists in the position set as the origin.

11. A method according to claim 10, wherein the sensor is a transmissive photosensor.

12. A method according to claim 7, wherein when the photosensitive material is exposed, the mask is shifted to the range in which the images on the negative film are capable of being exposed, to print and expose the photosensitive material located in a position of an optical path different in length from an optical path extending to the density measuring unit.

13. A method according to claim 7, wherein when the photosensitive material is exposed, the light beam is sent to the photosensitive material with the optical path thereof as linear.

14. A method according to claim 7, wherein when the photosensitive material is exposed, the light beam is sent to the photosensitive material with the optical path thereof in the optical-path branch prism as linear.

15. A variable mask mechanism capable of displacing a mask for partially blocking a light beam for exposing a photosensitive material when images on a negative film are exposed onto the photosensitive material and of changing an amount of opening of an aperture through which the light beam passes, comprising:

a drive source for displacing the mask to change the amount of opening of the aperture;

a sensor for detecting the mask to confirm a position of the mask; and a controller for controlling an operation of said drive source based on information sent from said sensor upon measuring a density of each image so as to align the mask with a range in which the density of each image on the negative film is measurable and for controlling the operation of said drive source based on the information to shift the mask to a range in which the images on the negative film are capable of being exposed, upon printing/exposing the photosensitive material, thereby changing the amount of opening of the aperture.

16. A variable mask mechanism according to claim 15, wherein said drive source comprises a motor and a gear for reducing a rotational speed of the motor and transferring the reduced rotational speed.

17. A variable mask mechanism according to claim 15, wherein said drive source comprises a motor and a plurality of gears for reducing a rotational speed of the motor and transferring the decreased rotational speed in two directions and mutually displacing a pair of mask leaves of the mask in a reverse direction.

18. A variable mask mechanism according to claim 17, wherein the motor is a pulse motor.

19. A variable mask mechanism according to claim 15, wherein said sensor is a transmissive photosensor.

20. A variable mask mechanism according to claim 15, wherein said controller first shifts the mask to a position set as an origin after the density of each image has been measured and then moves the mask the image exposable range.

* * * * *